US012487848B2

(12) United States Patent
Goh et al.

(10) Patent No.: US 12,487,848 B2
(45) Date of Patent: Dec. 2, 2025

(54) METHOD AND APPARATUS FOR COMPANION DEVICE HUB EXPERIENCE EFFICACY MANAGEMENT

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 672 days.

(21) Appl. No.: 17/870,778

(22) Filed: Jul. 21, 2022

(65) Prior Publication Data

US 2024/0028385 A1 Jan. 25, 2024

(51) Int. Cl.
*G06F 9/48* (2006.01)
*G06F 1/3228* (2019.01)

(52) U.S. Cl.
CPC .......... *G06F 9/4818* (2013.01); *G06F 1/3228* (2013.01)

(58) Field of Classification Search
None
See application file for complete search history.

(56) References Cited

U.S. PATENT DOCUMENTS

| 7,739,686 | B2 * | 6/2010 | Gebhart | G06F 9/505 |
| | | | | 709/201 |
| 8,700,622 | B2 | 4/2014 | Fay | |
| 8,700,623 | B2 | 4/2014 | Fay | |
| 8,813,080 | B2 | 8/2014 | Fenger | |
| 9,477,523 | B1 * | 10/2016 | Warman | G06F 9/5038 |
| 9,875,647 | B1 * | 1/2018 | Tannenbaum | G06F 21/42 |
| 10,630,804 | B1 * | 4/2020 | Thiagrajan | G06F 9/4881 |
| 10,970,113 | B1 | 4/2021 | Kurtzer | |
| 11,099,893 | B1 | 8/2021 | Kurtzer | |
| 11,327,827 | B1 * | 5/2022 | Satish | G06Q 10/06316 |
| 2003/0074387 | A1 * | 4/2003 | Tanaka | G06F 9/5038 |
| | | | | 718/103 |
| 2003/0233390 | A1 * | 12/2003 | Hurich | G06F 9/4401 |
| | | | | 718/102 |
| 2008/0222640 | A1 * | 9/2008 | Daly | G06F 9/4881 |
| | | | | 718/103 |

(Continued)

FOREIGN PATENT DOCUMENTS

WO 2022/072955 A1 4/2022

*Primary Examiner* — Adam Lee
(74) *Attorney, Agent, or Firm* — Prol Intellectual Property Law, PLLC; H. Kenneth Prol

(57) ABSTRACT

A companion device hub includes a hub processor, a hub memory device, and a hub power management unit (PMU). The companion device hub further includes a policy-based contextual system executed by the hub processor to prioritize the initialization of tasks on an information handling system operatively coupled to the companion device hub along with at least one peripheral device. The companion device hub also includes a task history generation system executed by the hub processor that captures contextual history data related to the tasks previously executed on the information handling system and, the policy based contextual system to select a load prioritization order based on the captured contextual history data to, during initialization of the information handling system, prioritize tasks based on the captured contextual history data.

20 Claims, 6 Drawing Sheets

(56) References Cited

U.S. PATENT DOCUMENTS

| | | | |
|---|---|---|---|
| 2009/0016015 A1* | 1/2009 | Seibert | G06F 1/1616 |
| | | | 361/679.41 |
| 2009/0158288 A1 | 6/2009 | Fulton | |
| 2015/0212826 A1* | 7/2015 | Miyabe | G06F 12/1433 |
| | | | 713/1 |
| 2016/0098154 A1* | 4/2016 | Ko | G06F 3/167 |
| | | | 345/173 |
| 2016/0191181 A1* | 6/2016 | Bailey | H04R 3/12 |
| | | | 381/77 |
| 2016/0192114 A1* | 6/2016 | Sole | H04L 65/65 |
| | | | 455/41.3 |
| 2016/0224426 A1* | 8/2016 | Holden | G06F 11/0709 |
| 2017/0083217 A1* | 3/2017 | Nitsan | G06F 9/451 |
| 2018/0170242 A1* | 6/2018 | Wang | H04L 67/125 |
| 2018/0196695 A1* | 7/2018 | Du | G06F 9/4881 |
| 2018/0204573 A1* | 7/2018 | Iwasa | G10L 15/30 |
| 2018/0288161 A1* | 10/2018 | Saxena | H04W 4/33 |
| 2018/0335968 A1* | 11/2018 | Pauley | G06F 3/068 |
| 2018/0358013 A1* | 12/2018 | Yoon | G10L 15/22 |
| 2019/0012248 A1* | 1/2019 | Yang | G06F 12/0893 |
| 2019/0069244 A1* | 2/2019 | Jeon | H04W 52/0274 |
| 2019/0201033 A1* | 7/2019 | Yates | G16H 40/67 |
| 2019/0201136 A1* | 7/2019 | Shelton, IV | A61B 1/051 |
| 2019/0377652 A1* | 12/2019 | Sahoo | G06F 11/3447 |
| 2020/0100269 A1* | 3/2020 | Gulbay | G06F 1/3212 |
| 2020/0124845 A1* | 4/2020 | Smith | G09G 5/363 |
| 2020/0286442 A1* | 9/2020 | Martinez | G06F 3/1423 |
| 2020/0302894 A1* | 9/2020 | Khen | G09G 5/14 |
| 2021/0026594 A1* | 1/2021 | Kessler | G06F 40/295 |
| 2021/0049019 A1* | 2/2021 | Agarwal | G06N 20/00 |
| 2021/0243676 A1* | 8/2021 | Files | H04W 48/06 |
| 2021/0303177 A1* | 9/2021 | Kanjirathinkal | G06F 3/0604 |
| 2021/0349844 A1* | 11/2021 | Schaefer | G06F 13/4282 |
| 2022/0147506 A1* | 5/2022 | Kwatra | G06F 16/2365 |
| 2022/0182440 A1* | 6/2022 | Schmidt | H04L 43/16 |
| 2022/0224649 A1* | 7/2022 | Lyer | H04L 47/24 |
| 2023/0017297 A1* | 1/2023 | Ramasamy | H04L 67/145 |
| 2023/0030857 A1* | 2/2023 | Yao | G06F 9/5038 |

\* cited by examiner

METHOD AND APPARATUS FOR COMPANION DEVICE HUB EXPERIENCE EFFICACY MANAGEMENT

FIELD OF THE DISCLOSURE

The present disclosure generally relates to a companion device hub. The present disclosure more specifically relates to optimizing the operations of a companion device hub as used with an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled to a companion device hub used to provide a number of resources to the information handling system including processing, software, and power resources among others as well as connectivity to one or more peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
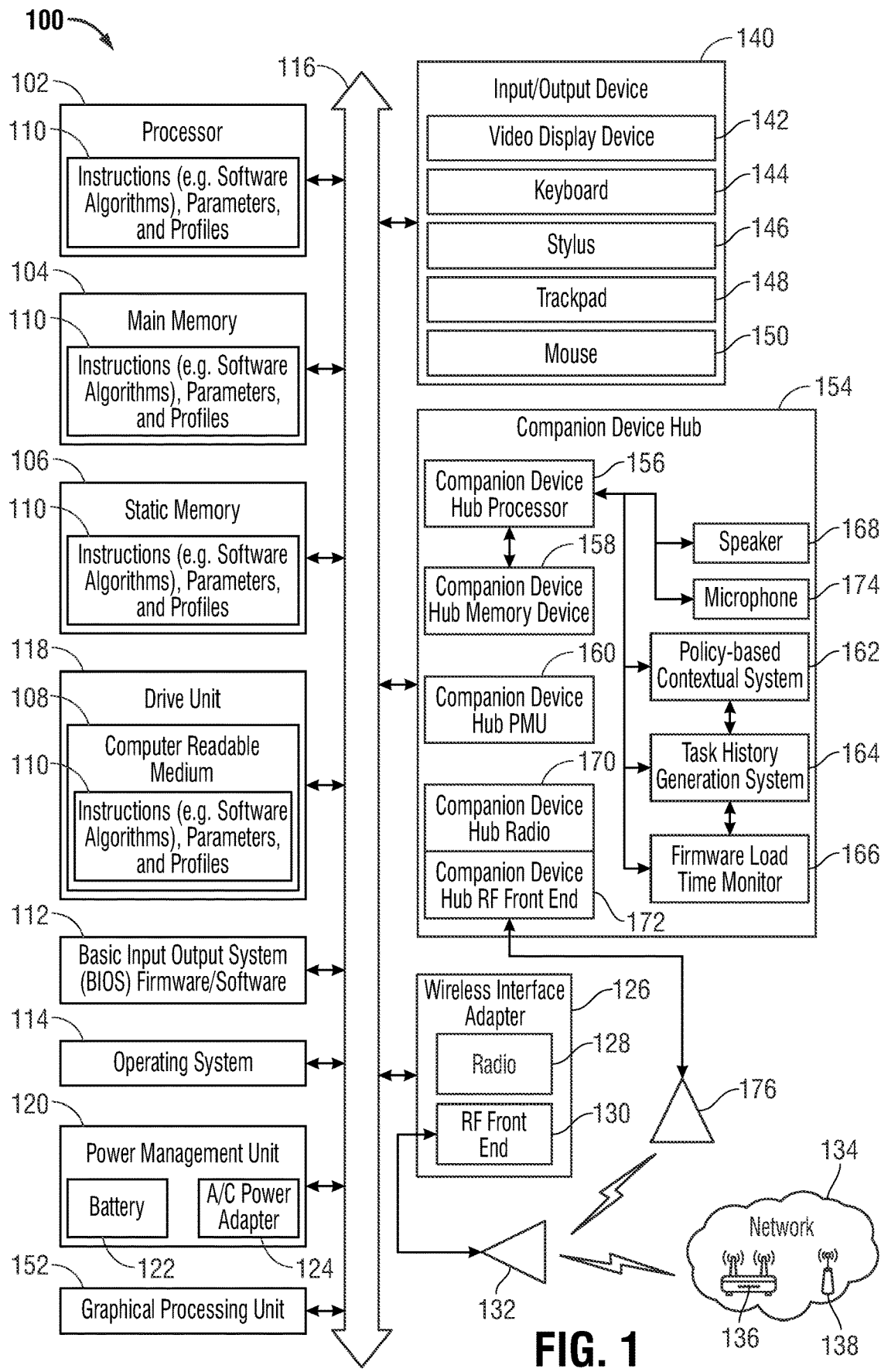
FIG. 1 is a block diagram of an information handling system with a companion device hub according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems may include those devices, often laptop-type information handling systems, some of which may be considered thin clients that are made to be physically thinner and light. These thin clients may include less processing, storage, software, firmware, or other resources than other laptop-type information handling systems in some embodiments. Information handling systems, including these thin clients, may be operatively coupled to other devices that provide additional levels of resources such as additional peripheral devices. In an example embodiment, these other devices include a companion device hub. The companion device hub may include, for example, additional processing resources used by the information handling system to assist in executing computer usable program code such as gaming software, word processing software, videoconferencing software, and the like. Additionally, the companion device hub may include data storage resources to provide the information handling system, when operatively coupled to the companion device hub, with extra data storage capabilities. The companion device hub may provide microphone and speaker resources in some embodiments. Via the companion device hub, the information handling system may be operatively coupled to one of many peripheral devices that may also include a smartphone, an external display device (separate from a display device of the information handling system), a mouse, an external hard drive, among other peripheral devices. These devices may be operatively coupled to the companion device hub via either a wired or wireless connection using a companion device hub radio.

Because the operation of the companion device hub in various embodiments includes executing computer readable program code, providing data to output devices, receiving data from input devices, and managing power throughput to an information handling system among other tasks, the execution of these tasks may be prioritized so that initialization of the information handling system may be optimized for expediency. The companion device hub may determine a load prioritization order from historical task operation from a recent usage of the information handling system or from external inputs, such as a voice command, received at the companion device hub in some embodiments. The companion device hub may transmit this load prioritization order to the basic input/output system (BIOS) or an embedded controller on the information handling system to establish a prioritized order of tasks, such as prioritized software or hardware loading, initializations, or updates to expedite a next subsequent boot up process for the information handling system according to embodiments herein.

In the present specification and in the appended claims, the term "task" is meant to mean a unit of execution or work performed by a processor such as processing resources at the information handling system or a companion device hub processor described herein. Examples include executions to be performed by processing resources at the information handling system or the hub processor for an execution of firmware, an execution of an application (e.g., computer readable program code), or other types of processes executed by a processing device.

The present specification describes a companion device hub that includes a hub processor, a hub memory device, and a hub power management unit (PMU). The companion device hub further includes a policy-based contextual system executed by the processor. The policy-based contextual system prioritizes the initialization of tasks on behalf of an information handling system operatively coupled to the companion device hub. With this policy-based contextual system, the companion device hub may further execute a task history generation system that captures contextual history data related to the tasks previously executed on the information handling system for determination of a future prioritized task order or task storyline also referred to as a load prioritization order to be followed on the information handling system. During initialization of the information handling system, this load prioritization order will prioritize tasks based on the captured contextual history data. For example, previous task order or task storylines may be learned in terms of priority and that task order or task storylines may be recognized as a load prioritization order and used in later initializations of the information handling system for quicker response to a user's requests or expectations.

The companion device hub may further include a firmware load time monitor to, when executed by the hub processor, monitor the anticipated load time of the tasks previously executed on the information handling system and initiate a plurality of tasks based on the anticipated load time of the tasks when the information handling system is initialized. The anticipated load time may, in an example embodiment, allow for relatively faster initialization of a task on the information handling system so that a user may continue quickly with the task that the user had previously ended with when the information handling system was previously shut down. This is because, in an embodiment, those tasks that are to be initialized first are those tasks that have the shortest load time. With the prioritization of initialization of tasks based on firmware load time, the complete initialization of the information handling system based on the contextual history data is completed faster than attempting to initialize all task concurrently.

In an embodiment, where one or more tasks are not initialized at the information handling system, the hub processor may execute the firmware load time monitor to monitor to determine when the prioritized tasks do not initiate and then initiate a power management mode that initiates a task identified within the contextual history data that consumes the least amount of power during initialization. This process may serve as a backup initialization process where one or all of those tasks identified in the contextual history data cannot be initialized or fail to be initialized properly.

In an embodiment, the initialization of tasks during boot-up of the information handling system based on the contextual history data may be superseded by a voice command from a user. In an embodiment, the companion device hub includes a microphone that continuously monitors for user commands. These commands may include commands to initialize a certain task such as a web conference. Upon detection of such a command, the companion device hub may provide instructions to the information handling system to adjust initializing tasks based on firmware load time and according to the contextual history data and, at least initially, cause those commands from the user to be conducted as part of an adjusted load prioritization order. In an example embodiment, activating a web-cam, executing a videoconferencing software, and execute, via the processor of the information handling system, any other tasks may be prioritized for use to conduct a videoconference session.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, a companion device hub, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any other network devices such as a companion device hub 154. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. In an embodiment, the video display device 142 may serve as a peripheral device to the companion device hub 154 with the companion device hub 154 serving to operatively couple the video display device 142 to the information handling system 100 using one or more connections on the companion device hub 154. Additionally, the information handling system 100 may include one or more input/output devices 140 including an alpha numeric input device such as a keyboard 144 and/or a cursor control device, such as a mouse 150, touchpad/trackpad 148, a stylus 146, a speaker or microphone that provides audio input/output for a user of a companion device hub 154 that allows a user to communicate with a remote user, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to a companion device hub 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. In an embodiment, the radio 128 may be used to operatively couple the information handling system 100 to the video display device 142 wirelessly. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset, a wireless stylus 146, and a wireless trackpad 148, among other wireless peripheral devices used as input/output (I/O) devices 140. In an alternative embodiment, a companion device hub radio 170 and companion device hub RF front end 172 may be used to operatively couple, wired or wirelessly via an antenna 176, each of these peripheral devices (input/output devices 140) to the information handling system 100 passing input/output through the companion device hub 154.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or WiFi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication including with the companion device hub 154 described herein. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may be operatively coupled to a companion device hub 154. The companion device hub 154 in the present disclosure may be any device that is operatively coupled to the information handling system 100 either via a wired or wireless connection. When connected to the information handling system 100 via a wired connection, the companion device hub 154 may provide power, processing, data storage, communication, and software resources to the information handling system 100. In an example embodiment, when the companion device hub 154 is operatively coupled to the information handling system 100, the companion device hub 154 may execute computer software program code via a companion device hub processor 156 for execution by a processor 102 of the information handling system 100, at a video display device 142, an application such as a video-conference application, a gaming application, a word processing application, among others. When operatively coupled to the information handling system 100 wirelessly, the companion device hub 154 may still provide processing resources, software resources, data storage resources, and other resources used to support the operation of the information handling system 100. The companion device hub 154 may be used by an information handling system 100 that is considered to be a thin client information handling system with limited processing, data storage, and software resources of its own or may assist an information handling system 100 to provide speedier operation and with connectivity to peripheral devices, power, and data. In an embodiment, the companion device hub 154 may allow a user to selectively operate the information handling system 100 as a thin client when not coupled to the information handling system 100 or as a relatively more resource-full information handling system when the companion device hub 154 is operatively coupled to the information handling system 100.

The companion device hub 154 includes a companion device hub processor 156 used to execute computer readable program code maintained on the companion device hub memory device 158. This computer readable program code may be executed by the companion device hub processor 156 to perform the functions of the companion device hub 154 described herein. For example, the companion device hub 154 may perform software-as-a-service (SAAS) functionalities as described herein to execute computer readable program code associated with one or more applications at the information handling system 100. Still further, the companion device hub memory device 158 may execute a policy-based contextual system 162, a task history generation system 164, and firmware load time monitor 166 via the companion device hub processor 156. The policy-based contextual system 162, task history generation system 164, and firmware load time monitor 166 may be executed to perform the functions described herein.

As described herein, the companion device hub processor 156 may execute a policy-based contextual system 162 to control the initialization of tasks at the information handling system 100. These tasks may be initialized in order of expected firmware load time and may follow load prioritization order storylines, also referred to as one or more load prioritization orders, that are learned and determined depending on detected information handling system 100 circumstances. The firmware load time monitor 166 may be operatively coupled to the policy-based contextual system 162 to inform the policy-based contextual system 162 of the anticipated initialization times of the firmware and applications. Often, as an information handling system 100 is booted up, a plurality of tasks are concurrently initialized leading to increased time in initializing all tasks necessary for the user to engage in, for example, a videoconferencing session, a gaming application, or a word processing application. Additionally, firmware associated with each of the I/O devices 140 may concurrently be initialized thereby increasing the time to initialize the task the user intends to conduct at the information handling system 100. In an example embodiment where a user wants to reengage in a gaming application after shutting down the information handling system 100 and rebooting the information handling system 100 again, the user may have to wait till all of the other firmware is initialized that are not associated with the operation of the information handling system 100 to execute this gaming application. For example, the gaming application may not need the stylus 146 to be initialized in order for the user to engage in the gaming experience because the stylus 146 is not used to provide input in a gaming session and the initialization or firmware update for a stylus 146 are learned or determined to be not high-priority in a load prioritization storyline for an information handling system 100 initialization for gaming. Other peripheral devices and firmware may also not be needed and such initialization of this other firmware concurrently with the initialization of the gaming application (and firmware of input devices for the gaming experience) may increase the time necessary to initialize the gaming application. The policy-based contextual system 162 may direct the firmware associated with the gaming application and its associated I/O devices 140 (e.g., microphone 174, speaker 168, mouse 150) to be initiated prior to any other firmware not necessary for the execution of the gaming application in a learned load prioritization order.

The policy-based contextual system 162 may implement the task history generation system 164 to determine which task is to be prioritized over others based on a historic list of tasks that the user engaged in prior to the information handling system 100 being booted up and other factors such as audio voice command inputs or other contextual inputs (e.g., location, time of day, calendar day, or other inputs). The task history generation system 164 may determine which tasks were previously executed on the information handling system 100 by the user and store that historic data on the companion device hub memory device 158. In an example embodiment, the task history generation system 164 may maintain a task history of those applications executed by the user on the information handling system 100 as well as any voice commands from the user that were received at the microphone 174 of the companion device hub 154. The microphone 174 may be operative coupled to the companion device hub processor 156 that may, in an embodiment, execute a voice recognition software used to detect the voice command and execute the appropriate task at the companion device hub 154. Those voice commands are also maintained in the companion device hub memory device 158 by the task history generation system 164 so that those tasks identified from the voice command are also listed within the historical task data. For example, a user may have engaged in a gaming application for a period of time at the user's residence. In order to be in a more relevant location, the user may shut the information handling system 100 down and go to a gaming café where other gamers are engaged in similar activities. In this example embodiment, the task history generation system 164 may record those initialization tasks as well as location or time of day, day of weeks, etc. used to operate the gaming application such as the initialization of some input devices (e.g., mouse 150, trackpad 148, speaker 168, and microphone 174) along with the execution of the computer readable program code associated with the gaming application. This task data is then stored on the companion device hub memory device 158 prior to the user shutting the information handling system 100 down and moving to the gaming café. When the user reaches the gaming café and starts the information handling system 100 up, the policy-based contextual system 162 may look to the historic task data created by the task history generation system 164 on the companion device hub memory device 158 to determine which task to initialize first. In this example, the first task to initialize is those tasks associated with initializing the firmware associated with the input devices and the execution of the gaming application. These tasks, per the execution of the policy-based contextual system 162 by the companion device hub processor 156, take precedence over other tasks that may not necessary be related to the execution of the gaming application in the load prioritization order storyline, for example, the initialization of the firmware associated with the stylus 146, execution of other computer readable program code (e.g., word processing software or videoconferencing software), among other tasks not directly related to and necessary for the operation of the gaming application in the load prioritization order storyline. This allows the gaming application to be initialized under such a recognized load prioritization order storyline with relatively less wait for the user and other tasks may be initialized at a later time. This gives the user the perception that the information handling system 100 and companion device hub 154 quickly initialize the gaming application as before and the user can immediately reengage in the gaming experience providing a better user experience. Similar situations may arise where a user was previously engaged in a videoconferencing session or executing a word processing application. The initialization of each of these tasks, when given priority according to the historic task data created on the companion device hub memory device 158 by the task history generation system 164 as a recognized load prioritization order storyline, may be given priority over all other tasks. In an embodiment, the companion device hub processor 156 may send the selected load prioritization order for initialization or bootup task order to the BIOS or an embedded controller (EC) at the information handling system. The processing device of the companion device hub may transmit this data to, in an example embodiment, an EC of the information handling system. In an embodiment, a companion device hub radio may be used to transmit this selected load prioritization order to the EC wirelessly. Where the companion device hub is connected to the information handling system via a wired connection, the transmission of the selected load prioritization order may be sent via this wired connection to the EC or BIOS in order for the information handling system to processes these tasks according to the load prioritization order.

In an embodiment, the microphone 174 may be used by the user to immediately circumvent any task indicated as a priority task on the historic task data on the companion device hub memory device 158. For example, where the user reaches a location and, instead of reengaging in a gaming application, wishes to engage in a videoconferencing session, the user may provide a voice command (e.g., "start up videoconference" as a contextual input) to give priority to the videoconferencing application and associated firmware and software to be initialized over a gaming load prioritization order storyline. The voice command may be received by the microphone 174 and provided to the companion device hub processor 156 for the companion device hub processor 156 to execute any firmware and/or software and initialize any hardware associated with the execution of that voice command. For example, where the voice command was "start up videoconference," the companion device hub processor 156 may prioritize the initialization of a webcam or other camera, execute a videoconferencing application, and execute firmware associated with the mouse 150 among other tasks in order to prioritize the initialization of a videoconferencing session. Again, this voice command causes those tasks associated with the voice command to be prioritized over any other tasks found within the historic task data created by the task history generation system 164 under a videoconferencing load prioritization order storyline. Once the videoconferencing session has been started, other tasks may start to take priority based on the historic data maintained on the companion device hub memory device 158 by the task history generation system 164 as described herein.

In an embodiment, the firmware load time monitor 166, when executed by the companion device hub processor 156, may be code instructions executed to monitor any task to be initiate to determine when the prioritized tasks do not initiate. In some instances, certain applications may not execute or some firmware may not be initialized at the information handling system 100. This may occur when, for example, firmware fails to get updated, the firmware is corrupted, computer readable program code is corrupted and the like. When this occurs, the firmware is not initialized, or the application does not execute properly. Here, the firmware load time monitor 166 may identify this situation and, as a back-up prioritization system, initiate a power management mode that initiates a task identified within the contextual history data that consumes the least amount of power during initialization. In this manner, the task that is prioritized first is that task that consumes the least amount of power with other tasks ordered for initialization based on their respective power consumption characteristics. Because increased processing of tasks creates higher thermal outputs from a processing device and because the higher thermal outputs may result in fewer tasks being completed, the task to be completed first includes the task that consumes the least amount of power (e.g., increased power usage results in more thermal output).

In an embodiment, the companion device hub 154 includes a companion device hub power management unit (PMU) 160. The companion device hub PMU 160 may manage the power provided to the components of the companion device hub radio 170 such as the companion device hub processor 156, a cooling system, input/output devices 140 operatively coupled to the companion device hub 154 such as the stylus, a mouse 150, a keyboard 144, and a trackpad 148 and other components that may require power when the companion device hub 154 is operatively coupled to the information handling system 100. In an embodiment, the companion device hub PMU 160 may monitor power levels and be electrically coupled, either wired or wirelessly, to the information handling system 100 to provide this power and coupled to bus 116 to provide or receive data or instructions. The companion device hub PMU 160 may regulate power from a power source such as a battery or A/C power adapter and may, in an embodiment, provide power to the PMU 120 of the information handling system 100. In an embodiment, the battery may be charged via the A/C power adapter and provide power to the components of the information handling system 100 via a wired connections as applicable, or when A/C power from the A/C power adapter is removed.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
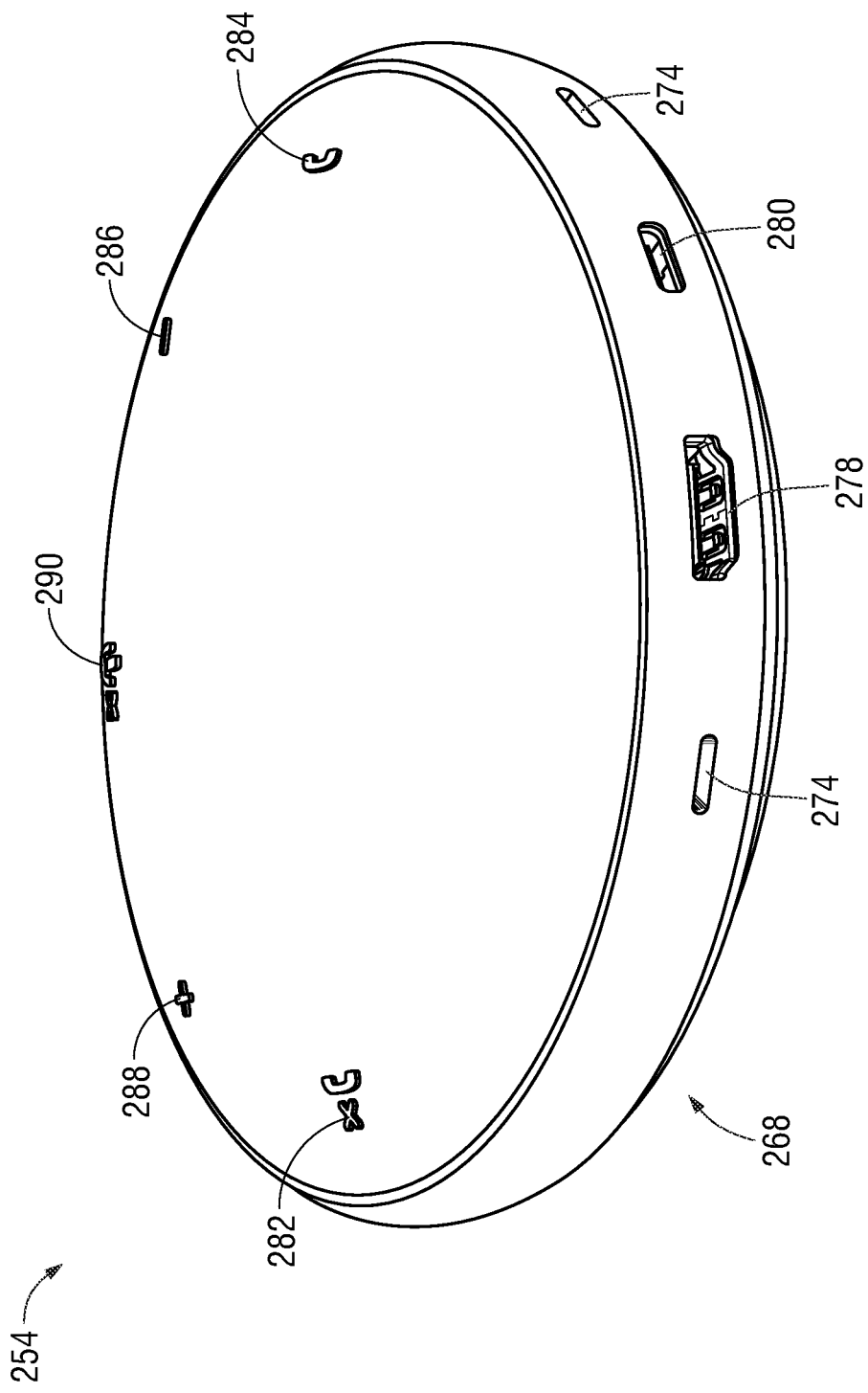
FIG. 2 is a graphic diagram of a companion device hub according to an embodiment of the present disclosure.

FIG. 2 is a graphic diagram of a companion device hub 254 according to an embodiment of the present disclosure. FIG. 2 shows the companion device hub 254 having, generally, a puck shape with a domed top and curved sides. The companion device hub 254 may be relatively small so that a user may carry it, along with an information handling system, to remote locations so that it may be used as described herein.

In addition to providing auxiliary processing, power, and software resources, among other resources, to the information handling system, the companion device hub 254 may be used, in some situations as a speakerphone that provides audio to the user and detects the user's voice. As described herein, the companion device hub 254 may include one or more microphones 274 oriented within the housing of the companion device hub 254 so that one or more users' voices may be detected. As described, these microphones 274 may be used to receive voice commands from the user in an example embodiment. In another embodiment, the microphones 274 may be used to detect and relay the user's voice across an internet or intranet when, for example, conducting a videoconferencing session as described herein. In an example embodiment, the companion device hub 254 may facilitate the transmission of audio data from the companion device hub 254 using voice over internet protocol (VOIP). Additionally, in an embodiment, the companion device hub 254 may include a speaker 268 to provide audio to the user. The microphones 274 and speaker 268, in an embodiment, may serve as a speakerphone used to conduct conversations during, for example, the videoconferencing sessions as described herein. In an embodiment, the speaker 268 may be formed on an underside of the companion device hub 254 with sufficient space provided (e.g., a lip or legs used to hold the companion device hub 254 above the surface) between the underside of the companion device hub 254 and a surface to emit audio for the user to hear.

The companion device hub 254 may further include one or more connectors used to operatively couple the companion device hub 254 to an information handling system as well as other peripheral devices such as an external monitor, a wired mouse (e.g., mouse 150, FIG. 1) an A/C power source, and other devices that are couplable to the companion device hub 254 via a wire. One connector may include a high-definition multimedia interface (HDMI) connector 278. The HDMI connector 278 may, for example, operatively couple an external monitor to the companion device hub 254 so that a user's desktop may be expanded from the video display device of the information handling system. Other connectors may include one or more universal serial bus C (USB-C) connectors 280. Again, the USB-C connectors 280 may be used to operatively couple a mouse, a keyboard, a smartphone, and other devices to the companion device hub 254 to increase the functionalities of the companion device hub 254 and the information handling system operatively coupled thereto.

As described herein, the companion device hub 254 may be used to conduct a conversation with remote participants to the conversation. To facilitate this, the companion device hub 254 may include one or more buttons 282, 284, 286, 288, and 290 used during such a conversation. In an example embodiment, a start call button 284 and end call button 282 may be used to start a VOIP call or videoconference session by actuating the button and end the VOIP call or videoconference session, respectively. Such a button press to start a videoconferencing session may be external input used to determine or select a load prioritization order storyline in an example. During operation, the user may press the start call button 284 causing the companion device hub 254 to execute computer program code that initiates this VOIP call or videoconferencing session. A volume up button 288 and volume down button 286 may also be provided to increase the volume and decrease the volume, respectively, of the audio from the speaker 268. A mute button 290 may also be provided to mute the microphones 274 so that a side conversation may be conducted during the VOIP or videoconference discussion without interrupting anyone. A microphone 274 may be used to record voice input command in another embodiment to adjust the load prioritization order storyline selected and circumvent any task indicated as a priority task based previously on the historic task data on the companion device hub memory device. Thus, the companion device hub may select and transmit to the information handling system an adjusted load prioritization order storyline commensurate with the voice command from the user or users. In one example embodiment, microphone 274 at the companion device hub 254 may continually detect if a voice command is received from a user.

During operation, the user may set the companion device hub 254 on a surface next to, for example, the information handling system so that the companion device hub 254 may be operatively coupled to the information handling system either via a wired connection or wirelessly. As described herein, a wired connection may be achieved by coupling the information handling system to a connection 278, 280 at the companion device hub 254. As wireless connection may include the companion device hub radio operatively coupling the companion device hub 254 to a radio of the information handling system. The user may also deploy any other peripheral devices around the companion device hub 254 and operatively couple these other peripheral devices to the companion device hub 254 or the information handling system.

During boot up of the information handling system, the policy-based contextual system may be executed by the companion device hub processor as described herein. As described, the policy-based contextual system may access the task history on the companion device hub memory device, receive any external inputs, and proceed to initiate those tasks based on the most recently captured task history or the received external inputs. In an embodiment, the external inputs may include the actuation of a button on a mouse, movement of a stylus, or actuation of a keyboard key among other indications that a user is providing external inputs used to adjust the selected load prioritization order storyline and circumvent any task indicated as a priority task based purely on the historic task data as described herein. Where a task cannot be initiated as described herein, the firmware load time monitor may indicate that the task cannot be completed and initiate a power management mode that initiates a task identified within the contextual history data that consumes the least amount of power during initialization.

Figure 3:
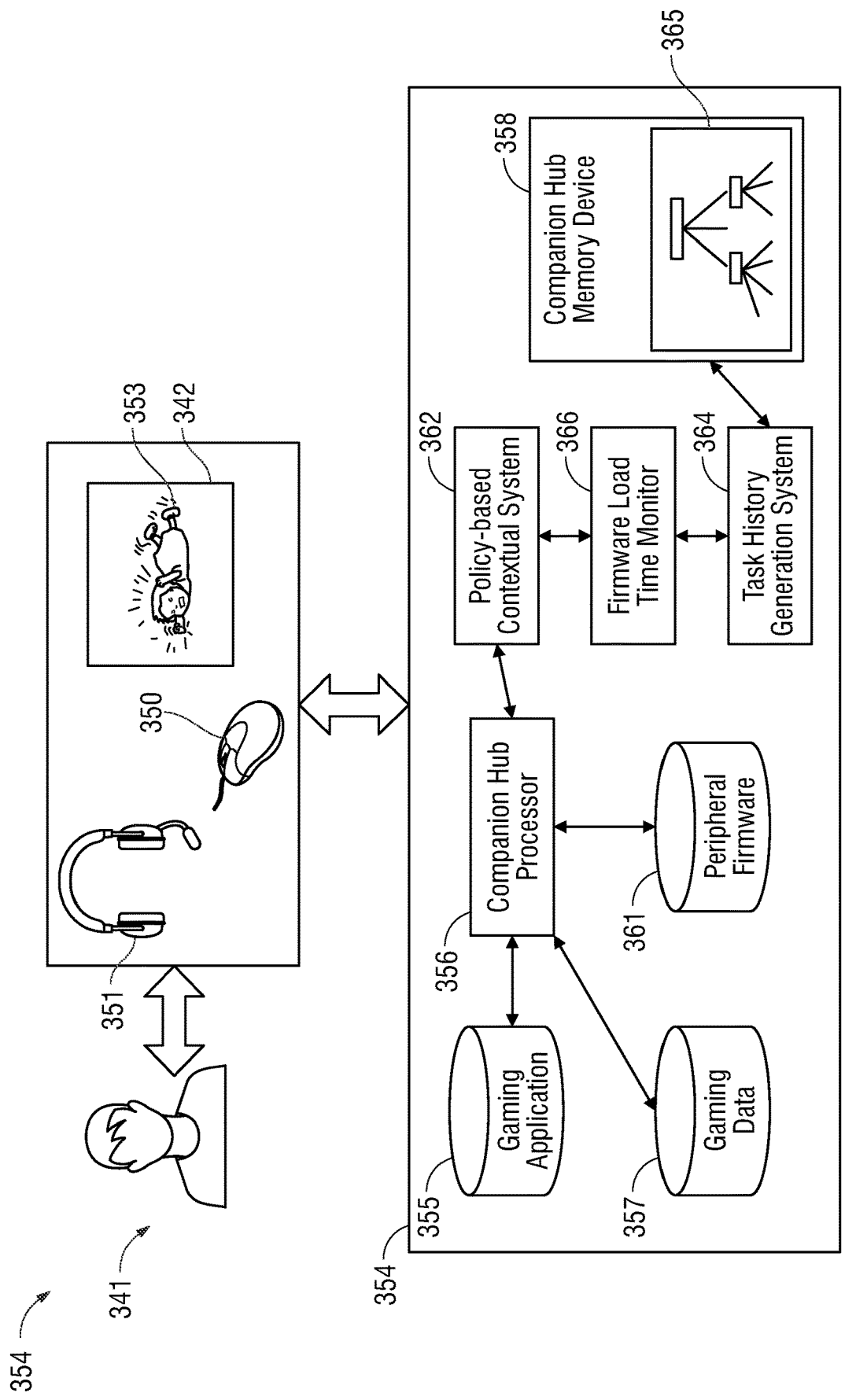
FIG. 3 is a graphic diagram of an example of contextual history data used by a task history generation system to initialize an information handling system according to another embodiment of the present disclosure.

FIG. 3 is a graphic diagram of an example contextual history data used by a task history generation system 364 to initialize an information handling system according to another embodiment of the present disclosure. The example execution of a policy-based contextual system 362 may be used, in the example embodiment presented in FIG. 3, to prioritize tasks based on the captured contextual history data. In an example embodiment, the task prioritized is a gaming task.

As described herein, a task history generation system 364 may generate contextual history data related to the tasks previously executed on the information handling system. The policy-based contextual system 362 may implement the task history generation system 364 to determine which task is to be prioritized over others based on a historic list of tasks that the user engaged in prior to the information handling system being booted up. The task history generation system 364 may determine which tasks were previously executed on the information handling system by the user and store that historic data on the companion device hub memory device 358. This task history may be used to determine or select a load prioritization order storyline to prioritize the order of tasks to be initiated by the processor of the information handling system. In an example embodiment, the task history generation system 364 may maintain a task history of those applications executed by the user on the information handling system as well as receive any voice commands or other external inputs (e.g., a button press) from the user that were received at the companion device hub 354. For example, a user may have engaged in a gaming application for a period of time at the user's residence. The task history generation system 364 may save this data on the companion device hub memory device 358 in, for example, a process tree layout that describes the software, firmware, and hardware history executed and used to during any task. For example, where a gaming application was one of the tasks previously executed on the information handling system, the process tree layout may include a point that describes that a gaming application was executed and from that node, it's recency of execution, and list all the firmware executed and associated hardware used by the user to engage in the gaming experience.

In order to be in a more relevant location, the user may shut the information handling system down and go to a gaming café where other gamers are engaged in similar activities. In this example embodiment, the task history generation system 364 may record those initialization tasks used to operate the gaming application such as the initialization of some input devices as external input (e.g., mouse, trackpad, speaker, and microphone) along with the execution of the computer readable program code associated with the gaming application. This task data is then stored on the companion device hub memory device 358 prior to the user shutting the information handling system down and moving to the gaming café. When the user reaches the gaming café and starts the information handling system up, the policy-based contextual system 362 may receive a location of the information handling system, and look to the historic task data created by the task history generation system 364 on the companion device hub memory device 358, receive external input such as a gaming controller input, keyboard input, mouse input, or utilize any combination of task history or external inputs to determine which task to initialize first. In this example, the first task to initialize is those tasks associated with initializing the firmware associated with the input devices and the execution of the gaming application. This process includes the companion device hub processor 356 accessing a gaming application 355 to execute the computer readable program code associated therewith. In an embodiment, gaming data 357 may be accessed describing, for example, gaming progression data, gaming art, and other associated data related to the execution of the gaming application. In an embodiment, peripheral firmware 361 may also be accessed by the companion device hub processor 356 in order to execute that peripheral firmware 361 associated with peripheral devises previously used by the user 341 during the gaming experience. This peripheral firmware 361 may include firmware associated with a mouse 350, a trackpad, a gaming controller, a head-mounted display device, a stylus, an external display device, a headset 351, among others.

As shown in FIG. 3, the execution of the gaming application 355 by the companion device hub processor 356 causes the user to see on a display device 342 a graphical user interface (GUI) 353 representing the game play that the user 314 may interact with. The user 341 may interact with this game play via, for example, the mouse 350, a headset 351, a keyboard, a gaming controller, or the like operatively coupled to the companion device hub 354 either via a wired connection or wireless link.

These tasks associated with the execution of a gaming application, per the execution of the policy-based contextual system 362 by the companion device hub processor 356, take precedence in the load prioritization order storyline selected over other tasks that may not necessarily be related to the execution of the gaming application. For example, the initialization of the firmware associated with the stylus, execution of other computer readable program code (e.g., word processing software or videoconferencing software), among other task may not directly related to and necessary for the operation of the gaming application and may initialize afterwards or not at all. This allows the gaming application to be initialized with relatively less wait for the user while other tasks are initialized at a later time. Thus, the user perceives that the information handling system and companion device hub 354 quickly initializes the gaming application as before and the user can immediately reengage in the gaming experience. Similar situations may arise where a user was previously engaged in a videoconferencing session or executing a word processing application. The initialization of each of these tasks, when given priority according to the historic task data created on the companion device hub memory device 358 by the task history generation system 364 and external inputs received, may be given priority in the load prioritization order storyline selected over all other tasks.

Figure 4:
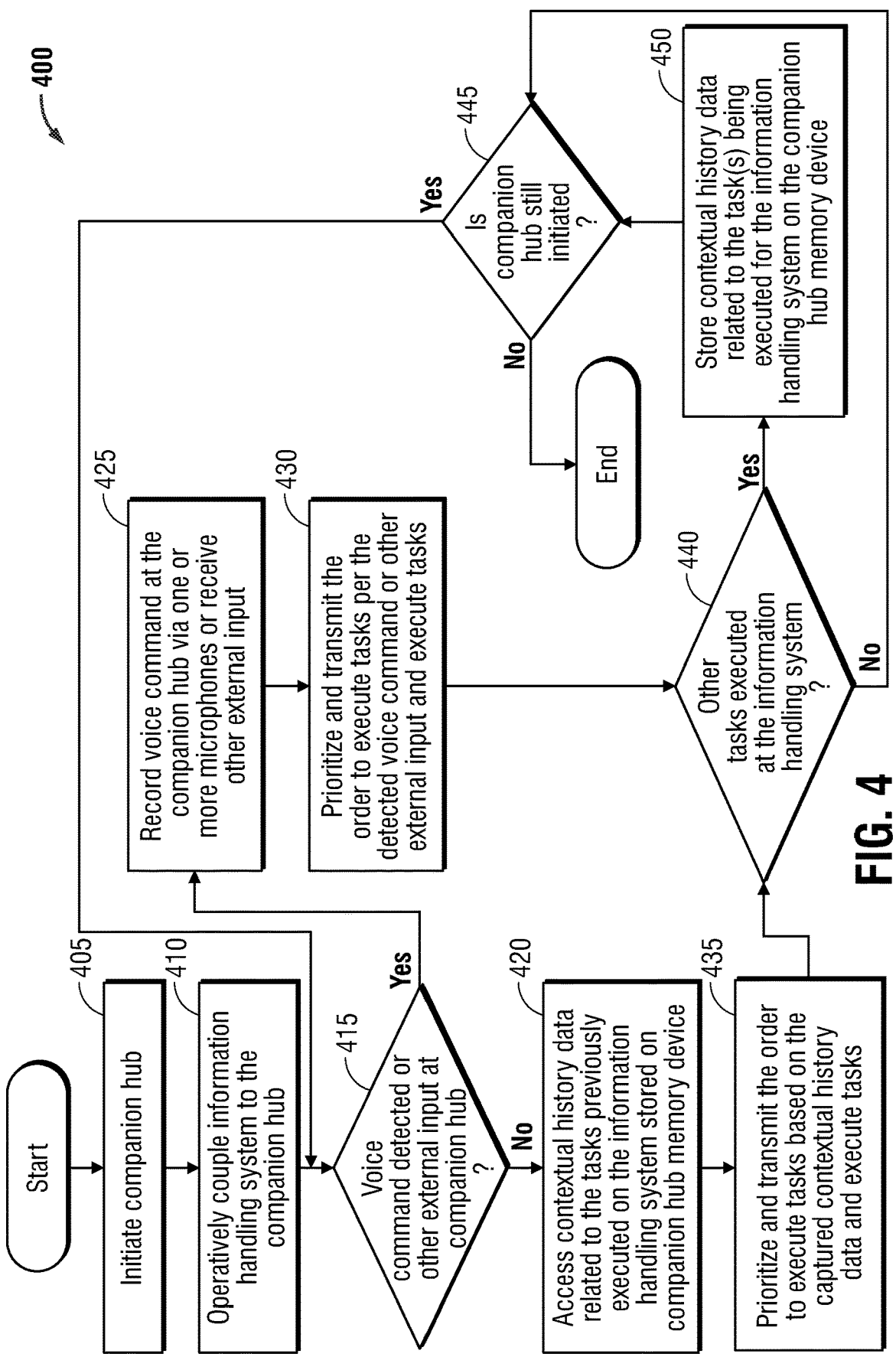
FIG. 4 is flow diagram of an example method of generating contextual history data according to an embodiment of the present disclosure.

FIG. 4 is flow diagram of an example method 400 of generating contextual history data used for a load prioritization order according to an embodiment of the present disclosure. The method 400 includes, among other process, detecting a voice command, button push, or other external input of a user in order to generate with contextual task history used for a load prioritization order during execution of an information handling system operatively coupled to the companion device hub described herein.

The method 400 may include, at block 405, initiating a companion device hub. This initiation of the companion device hub may include operatively coupling the companion device hub to a power source in some embodiments. The initiating process may further include the user actuating a power button on the companion device hub. The initiation of the companion device hub may initially detect whether and what peripheral devices, and whether an information handling system (e.g., a thin client device), are operatively coupled to the companion device hub.

The method 400 further includes, at block 410, with operatively coupling the information handling system to the companion device hub if not already coupled. As described herein, a user may operatively couple the information handling system to the companion device hub via a wired connection such as a USB-C or other connection or serial port on the companion device hub in an embodiment. In an embodiment, the companion device hub may use a wireless radio to operatively couple the companion device hub to an information handling system via a wireless protocol such as a Bluetooth® protocol.

The method 400 may include, at block 415, determining whether a voice command has been detected at a microphone or button press, or other external input has been received from a user of the companion device hub. The determination of whether a voice command is received may be conducted continuously, in an example embodiment, with the microphone consistently monitoring for a voice command or, in some embodiments, a wake command followed by a voice command. Where no voice command or other external input is detected, the method 400 may continue to block 420 as described herein. Where a voice command or other external input is detected, the method 400 may continue to block 425 with recording the voice command via one or more microphones at the companion device hub using the companion device hub processor. The one or more microphones may be operatively coupled to the companion device hub processor within the companion device hub.

In an example embodiment, where the user wishes to engage in a videoconferencing session, the user may provide a voice command (e.g., "start up videoconference") or press a call button on the companion device hub to give priority to the videoconferencing application and associated firmware and software to be initialized rather than other tasks provided at the contextual history data created by the task history generation system and stored on the companion device hub memory device. Because, at block 415, the companion device hub has detected a voice command, the voice command is recorded at block 425. Other external input may be received at block 425 such as actuations of a button, a keyboard key, a mouse key, movement of a stylus, or other external input as described herein. The companion device hub processor may, via an audio processing firmware, process the audio received by the microphones and determine which voice command was spoken by the user in an embodiment. In other embodiments, other received external input may be determined by a hub processor to relate to selection of load prioritization order.

The companion device hub processor may then, at block 430, determine the selected load prioritization order and transmit the same to the BIOS or EC of the information handling system. The method 400 further includes transmitting the selected load prioritization order for initialization or bootup task order to the BIOS or an embedded controller (EC) at the information handling system at block 430. The processing device of the companion device hub may transmit this data to, in an example embodiment, an EC of the information handling system. In an embodiment, a companion device hub radio may be used to transmit this selected load prioritization order to the EC wirelessly. Where the companion device hub is connected to the information handling system via a wired connection, the transmission of the selected load prioritization order may be sent via this wired connection to the EC or BIOS in order for the information handling system to processes these tasks according to the load prioritization order.

With the load prioritization order received, the information handling system may execute any firmware and/or software and initialize any hardware in a prioritized load order associated with the execution of that task defined by the voice command or external input. For example, where the voice command was "start up videoconference," or another external input for a videoconference session is received, the companion device hub processor may prioritize the order of the initialization of a webcam or other camera, execute a videoconferencing application, and execute firmware associated with the mouse among other tasks in order to prioritize the initialization of a videoconferencing session. Again, this voice command causes those tasks associated with the voice command to be prioritized over any other tasks found within the historic task data created by the task history generation system. Other tasks may be initialized after these tasks associated with the operation of the videoconference session have been initialized. In an example embodiment, once the videoconferencing session has been started, other tasks may start to take priority based on the historic data maintained on the companion device hub memory device by the task history generation system as described herein. After the tasks associated with the tasks defined by the voice command or other external input at block 430, the method 400 may proceed to block 440 with the companion device hub processor to determine whether additional tasks such as load and initialization are to occur for the information handling system.

Returning to block 415, where no voice command or no further external inputs are detected at the microphones at block 415, the method 400 may continue to block 420 with the companion device hub processor accessing the contextual history data related to the tasks previously executed on the information handling system and stored on the companion device hub memory device. As described herein, the policy-based contextual system may implement the task history generation system to determine which task is to be prioritized over others based on a historic list of tasks that the user engaged in prior to the information handling system being booted up. The task history generation system may determine which tasks were previously executed on the information handling system by the user and store that historic data on the companion device hub memory device. In an example embodiment, the task history generation system may maintain a task history of those applications executed by the user on the information handling system. Thus, recent task history may be used to determine and select a load prioritization order to be executed by the information handling system.

The method 400 further includes, at block 435, prioritizing and transmitting for execution at the information handling system those prioritized tasks according to the selected load prioritization order that is based on the captured contextual history data in an embodiment. The method 400 includes transmitting the selected load prioritization order for initialization or bootup task order to the BIOS or an embedded controller (EC) at the information handling system at block 435. The processing device of the companion device hub may transmit this data to, in an example embodiment, an EC of the information handling system. In an embodiment, a companion device hub radio may be used to transmit this selected load prioritization order to the EC wirelessly. Where the companion device hub is connected to the information handling system via a wired connection, the transmission of the selected load prioritization order may be sent via this wired connection to the EC or BIOS in order for the information handling system to processes these tasks according to the load prioritization order.

In one example embodiment, a user may have engaged in a gaming application for a period of time at the user's residence. In order to be in a more relevant location, the user may shut the information handling system down and go to a gaming café where other gamers are engaged in similar activities. In this example embodiment, the task history generation system may record those initialization tasks used to operate the gaming application such as the initialization of some input devices (e.g., mouse, trackpad, speaker, and microphone or headset) along with the execution of the computer readable program code associated with the gaming application. This task data is then stored on the companion device hub memory device prior to the user shutting the information handling system down and moving to the gaming café. When the user reaches the gaming café and starts the information handling system up, the policy-based contextual system may look to the historic task data (at block 420) created by the task history generation system on the companion device hub memory device to determine the resulting load prioritization order and which task to initialize first. In this example, the first task to initialize is those tasks associated with initializing the firmware associated with the input devices and the execution of the gaming application. These tasks, per the execution of the policy-based contextual system by the companion device hub processor, take precedence over other tasks that may not necessary be related to the execution of the gaming application, for example, the initialization of the firmware associated with the stylus, execution of other computer readable program code (e.g., word processing software or videoconferencing software), among other tasks not directly related to and necessary for the operation of the gaming application. This allows the gaming application to be initialized with relatively less wait for the user while other tasks are initialized at a later time. Thus, the user perceives that the information handling system and companion device hub quickly initializes the gaming application as before and the user can immediately reengage in the gaming experience. Similar situations may arise where a user was previously engaged in a videoconferencing session or executing a word processing application in other example embodiments. The initialization of each of these tasks, when given priority according to the historic task data created on the companion device hub memory device by the task history generation system, may be given priority over all other tasks. The method may then proceed to block 440.

The method 400 may further include, at block 440, with determining whether other tasks were executed at the information handling system thereby creating new or additional contextual history data at the companion device hub as described herein. Where other tasks were executed on the information handling system (e.g., other tasks beside the gaming application such as a videoconferencing session or word processing application), the method 400 includes, at block 450, with storing contextual history data related to the task(s) being executed for the information handling system on the companion device hub memory device. This allows new or additional contextual history data to be created allowing a user to continue with those tasks later with those tasks being given priority over other tasks as part of a load prioritization as described herein.

Whether or not other tasks were executed at the information handling system at block 440, the method 400 includes determining, at block 445 with determining whether the companion device hub is still initiated. Where the companion device hub is no longer initiated (e.g., power has been removed from the companion device hub), the method 400 may end here. Where the companion device hub is still initiated, the method may return to block 415 as described herein.

Figure 5:
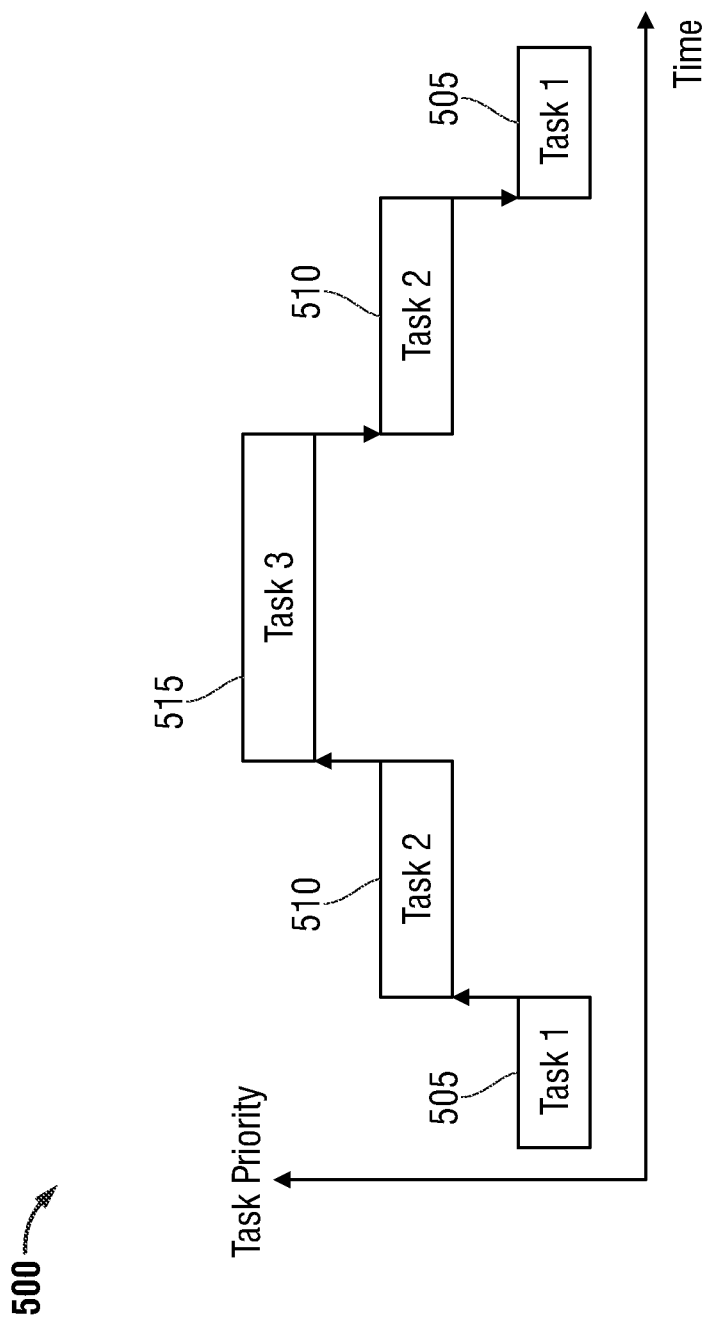
FIG. 5 is a block diagram describing a power management process for optimizing performance at the companion device hub according to an embodiment of the present disclosure.

FIG. 5 is a block diagram describing a power management process 500 for optimizing performance at the companion device hub according to an embodiment of the present disclosure. As described herein, where certain tasks listed on the contextual history data do not load, the companion device hub processor of the companion device hub may execute a firmware load time monitor to monitor to determine when the prioritized tasks do not initiate and then initiate a power management mode. This power management mode, graphically depicted in FIG. 5, may direct the companion device hub processor to initiate those tasks identified within the contextual history data that consumes the least amount of power during initialization.

FIG. 5 shows tasks that are prioritized along a timeline of operations. In an example, a first task 505 may be initiated first. The selection of the first task 505 to be selected first, in an example embodiment, is related to the firmware load time monitor determining that the first task 505 will consume less power over time or taken less time to load. This task may include those tasks that can quickly be executed by the companion device hub processor. This determination by the firmware load time monitor that the task will consume the least amount of power may be directly related to the processing power of the companion device hub and the abilities of the companion device hub processor to execute computer readable program code, address firmware, and hardware devices within the companion device hub and/or the information handling system. A next task may include a second task 510 that may, due to the processing resources necessary to execute that task, consume more power than the first task 505 but less power than a third task 515. Again, these tasks 505, 510, and 515 may be any type of tasks determined by the firmware load time monitor to be initiated in the order shown in FIG. 5. As described herein, the firmware load time monitor may also consider the thermal output anticipated based on the processing resources consumed during initiation of any of these tasks 505, 515, 520 and prevent certain tasks from being initiated until a detected threshold temperature has been met. In an embodiment, a temperature sensor may be used by the firmware load time monitor to also monitor for temperatures that exceed this temperature threshold.

Figure 6:
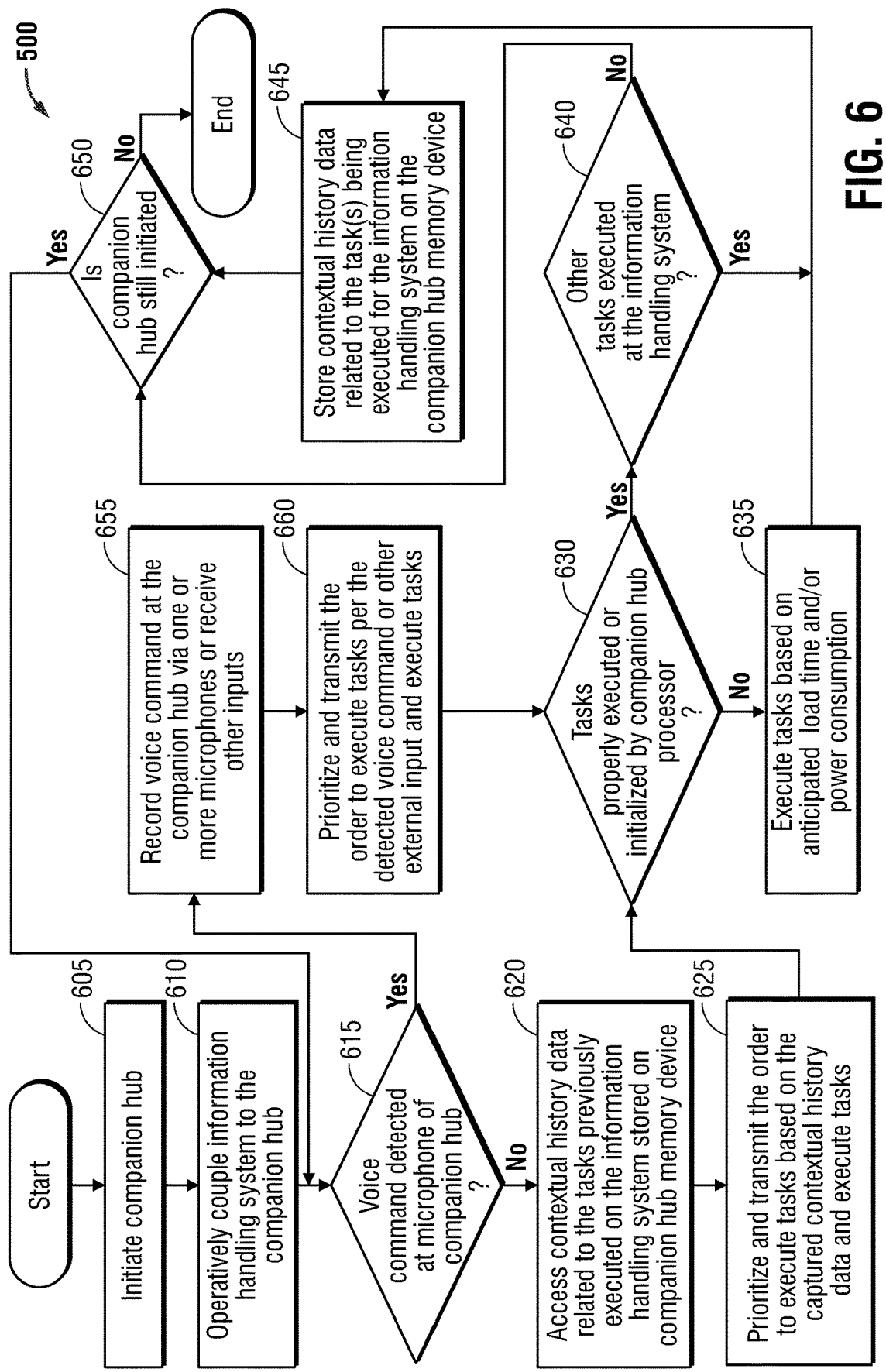
FIG. 6 is a flow diagram of a method of operating a companion device hub according to another embodiment of the present disclosure.

FIG. 6 is a flow diagram of a method of operating a companion device hub according to an embodiment of the present disclosure. The method 600 includes, among other processes, detecting a voice command or other external input of a user and accessing contextual task history to determine a load prioritization order during execution of an information handling system operatively coupled to the companion device hub described herein. The method 600 further includes a determination of whether the tasks listed on the contextual history data were or were not properly initialized.

The method 600 may include, at block 605, initiating a companion device hub. This initiation of the companion device hub may include operatively coupling the companion device hub to a power source in some embodiments. The initiating process may further include the user actuating a power button on the companion device hub. The initiation of the companion device hub may initially detect whether and what peripheral devices, or whether an information handling system (e.g., a thin client device), is operatively coupled to the companion device hub.

The method 600 further includes, at block 610, with operatively coupling the information handling system to the companion device hub. As described herein, a user may operatively couple the information handling system to the companion device hub via a wired connection such as a USB-C or other connection or serial port on the companion device hub in an embodiment. In an embodiment, the companion device hub may use a wireless radio to operatively couple the companion device hub to an information handling system via a wireless protocol such as a Bluetooth® protocol.

The method 600 may include, at block 615, determining whether a voice command has been detected at a microphone of the companion device hub or another external input such as a videoconference call button press has been received in some embodiments. The determination of whether a voice command or other external input is received may be conducted continuously, in an example embodiment, with the microphone consistently monitoring for a voice command or, in some embodiments, a wake command followed by a voice command. Where no voice command or other external input is detected, the method 600 may continue to block 620 as described herein. Where a voice command or other external input is detected, the method 600 may continue to block 655 with recording the voice command via one or more microphones at the companion device hub or receiving another type of external input using the companion device hub processor. The one or more microphones or other external input such as a videoconference call button or gaming controller button may be operatively coupled to the companion device hub processor within the companion device hub.

In an example embodiment, where the user wishes to engage in a videoconferencing session, the user may provide a voice command (e.g., "start up videoconference") or provide other external input to give priority to the videoconferencing application and associated firmware and software to be initialized rather than other tasks provided at the contextual history data created by the task history generation system and stored on the companion device hub memory device. Because, at block 615, the companion device hub has detected a voice command, the voice command is recorded at block 655. For other external inputs, these are received and stored at block 655. The companion device hub processor may, via an audio processing firmware, process the audio received by the microphones and determine which voice command was spoken by the user. In another embodiment, the companion device hub processor may process other received external input to determine the input command received from the user.

The companion device hub processor may then, at block 660, determine the selected load prioritization order and transmit the same to the BIOS or EC of the information handling system. The method 600 further includes transmitting the selected load prioritization order for initialization or bootup task order to the BIOS or an embedded controller (EC) at the information handling system at block 660. The processing device of the companion device hub may transmit this data to, in an example embodiment, an EC of the information handling system. In an embodiment, a companion device hub radio may be used to transmit this selected load prioritization order to the EC wirelessly. Where the companion device hub is connected to the information handling system via a wired connection, the transmission of the selected load prioritization order may be sent via this wired connection to the EC or BIOS in order for the information handling system to processes these tasks according to the load prioritization order.

With the load prioritization order received, the information handling system may execute any firmware and/or software and initialize, according to the load prioritization order, any hardware associated with the execution of that task defined by the voice command or external input and associated with a load prioritization order for the information handling system. For example, where the voice command was "start up videoconference," or another external input for a videoconference is received, the companion device hub processor may prioritize the initialization of a webcam or other camera, execute a videoconferencing application, and execute firmware associated with the mouse among other tasks in order to prioritize the initialization of a videoconferencing session. Again, this voice command or other external input causes those tasks associated with the voice command or other external input to be prioritized by a load prioritization determined by the policy-based contextual system over any other tasks found within the historic task data created by the task history generation system. Other tasks may be initialized after these tasks associated with the operation of the videoconference session have been initialized. In an example embodiment, once the videoconferencing session has been started, other tasks may start to take priority based on the historic data maintained on the companion device hub memory device by the task history generation system as described herein. After the tasks associated with the tasks defined by the voice command or other external input at block 660, the method 600 may proceed to block 630 with the companion device hub processor to determine if tasks are properly executed or initialized.

Where no voice command or other external inputs are detected, the method 600 may continue to block 620 with the companion device hub processor accessing the contextual history data related to the tasks previously executed on the information handling system and stored on the companion device hub memory device. As described herein, the policy-based contextual system may implement the task history generation system to determine which task is to be prioritized over other tasks by a load prioritization determined by the policy-based contextual system based on a historic list of tasks that the user engaged in prior to the information handling system being booted up. The task history generation system may determine which tasks were previously executed on the information handling system by the user and store that historic data on the companion device hub memory device. In an example embodiment, the task history generation system may maintain a task history of those applications executed by the user on the information handling system.

The method 600 further includes, at block 625, determining the selected load prioritization order and transmit the same to the BIOS or EC of the information handling system. The method 600 further includes transmitting the selected load prioritization order for initialization or bootup task order to the BIOS or an embedded controller (EC) at the information handling system at block 625. The processing device of the companion device hub may transmit this data to, in an example embodiment, an EC of the information handling system. In an embodiment, a companion device hub radio may be used to transmit this selected load prioritization order to the EC wirelessly. Where the companion device hub is connected to the information handling system via a wired connection, the transmission of the selected load prioritization order may be sent via this wired connection to the EC or BIOS in order for the information handling system to processes these tasks according to the load prioritization order.

With the load prioritization order received, the information handling system may execute those prioritized tasks in an order based on the captured contextual history data. For example, a user may have engaged in a gaming application for a period of time at the user's residence during recent information handling system usage. In order to be in a more relevant location, the user may shut the information handling system down and go to a gaming café where other gamers are engaged in similar activities. In this example embodiment, the task history generation system may record those initialization tasks used to operate the gaming application such as the initialization of some input devices (e.g., mouse, trackpad, speaker, and microphone or headset) along with the execution of the computer readable program code associated with the gaming application. This task data is then stored on the companion device hub memory device prior to the user shutting the information handling system down and moving to the gaming café. When the user reaches the gaming café and starts the information handling system up, the policy-based contextual system may look to the historic task data (at block 620) created by the task history generation system on the companion device hub memory device to determine a load prioritization order for which task to initialize first for a gaming activity to get loaded quickly.

In this example, the first task to initialize is those tasks associated with initializing the firmware associated with the input devices and for gaming (e.g., a keyboard, controller, etc.) and the execution of the gaming application. These tasks, per the execution of the policy-based contextual system by the companion device hub processor, take precedence over other tasks that may not necessary be related to the execution of the gaming application, for example, the initialization of the firmware associated with the stylus, execution of other computer readable program code (e.g., word processing software or videoconferencing software), among other tasks not directly related to and necessary for the operation of the gaming application. This allows the gaming application to be initialized with relatively less wait for the user while other tasks are initialized at a later time. Thus, the user perceives that the information handling system and companion device hub quickly initializes the gaming application as before and the user can immediately reengage in the gaming experience. Similar situations may arise where a user was previously engaged in a videoconferencing session or executing a word processing application in other example embodiments. The initialization of each of these tasks, when given priority according to the historic task data created on the companion device hub memory device by the task history generation system, may be given priority over all other tasks.

The method 600 may further include, at block 630, with determining whether the tasks listed on the contextual history data were properly initialized or executed by the companion device hub processor. As described herein, where certain tasks listed on the contextual history data do not load or do not load properly, the companion device hub processor of the companion device hub may execute a firmware load time monitor to monitor to determine when the prioritized tasks do not initiate or load properly and then initiate a power management mode. In some instances, certain applications may not execute, or some firmware may not be initialized or loaded properly at the information handling system and the firmware load time monitor may indicate this at block 630. This may occur when, for example, firmware fails to get updated, the firmware is corrupted, computer readable program code is corrupted and the like. When this occurs at block 630, the firmware is not initialized, or the application may not execute properly.

Here, the firmware load time monitor may identify this situation and, at block 635 as a back-up prioritization system, initiates a power management mode that initiates a task identified within the contextual history data that consumes the least amount of power during initialization or is initialized at the shorter period of time. In this manner, the task that is prioritized first is that task that consumes the least amount of power (e.g., shortest load time) with other tasks ordered for initialization based on their respective power consumption and load time characteristics. Because increased processing of tasks creates higher thermal outputs from a processing device, the higher thermal outputs may result in fewer tasks being completed as a result. As the temperature of the information handling system increases in some embodiments, certain steps may be taken to reduce the temperature of the processor of the information handling system which may include this back-up task prioritization process that reduces the number of tasks initialized at the information handling system. In these embodiments, the task to be completed first may further include the task that consumes the least amount of power (e.g., increased power usage results in more thermal output). Where this back-up task prioritization process is completed at block 635, the method 600 continues to block 645 as described herein.

Where the tasks are being properly executed at block 630, the method 600 proceeds to block 640 with determining whether other tasks were executed at the information handling system thereby creating new or additional contextual history data at the companion device hub as described herein. Where other tasks were executed on the information handling system (e.g., other tasks beside the gaming application such as a videoconferencing session or word processing application), the method 600 includes, at block 645, with storing contextual history data related to the task(s) being executed for the information handling system on the companion device hub memory device. This allows new or additional contextual history data to be created allowing a user to continue with those tasks later with those tasks being given priority over other tasks as described herein.

Whether or not other tasks were executed at the information handling system at block 645, the method 600 includes determining, at block 650, with determining whether the companion device hub is still initiated. Where the companion device hub is no longer initiated (e.g., power has been removed from the companion device hub), the method 600 may end here. Where the companion device hub is still initiated, the method may continue to block 615 as described herein.

The blocks of the flow diagrams of FIGS. 4 and 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A companion device hub operatively coupled to at least one peripheral device for operation with an operatively coupled information handling system, the companion device hub to control initialization of tasks at the operatively coupled information handling system comprising:
a hub processor;
a hub memory device;
a hub power management unit (PMU);
the hub processor executing machine readable code instructions of a task history generation system to capture contextual history data the of a first plurality of tasks previously executed on the information handling system; and
the hub processor executing machine readable code instructions of a firmware load time monitor to, when a different second plurality of tasks does not completely initiate:
initiate, during initialization of the information handling system, an initialization management mode that initiates, based on the contextual history data, a highest priority task of the different second plurality of tasks that has a shortest anticipated load time for initialization among the different second plurality of tasks.

2. The companion device hub of claim 1, wherein the different second plurality of tasks does not completely initiate when at least one of firmware fails to update and the firmware is corrupted.

3. The companion device hub of claim 1 further comprising:
the hub processor executing machine readable code instructions of the firmware load time monitor to, when the different second plurality of tasks does not completely initiate, initiate, during the initialization of the information handling system, the initialization management mode that initiates, based on the contextual history data, the highest priority task of the different second plurality of tasks and that has the shortest anticipated load time for initialization among the different second plurality of tasks and consumes the lowest amount of power during the initialization.

4. The companion device hub of claim 1 further comprising:
a speaker to provide audio output to a user of the companion device hub.

5. The companion device hub of claim 1 further comprising:
a microphone to receive a voice command from a user of the companion device hub that is received by the hub processor executing machine readable code instructions of the policy based contextual system, wherein a load prioritization order of the second plurality of tasks is based on the received voice command and the captured contextual history data, the microphone being an active microphone to detect voice commands.

6. The companion device hub of claim 1 further comprising:
the hub processor executing machine readable instructions of the policy based contextual system to receive a command from an input external to the companion device hub, wherein a load prioritization order of the second plurality of tasks is based on the external input and to the captured contextual history data.

7. The companion device hub of claim 1, further comprising:
a companion device hub radio to operatively couple the companion device hub to the information handling system.

8. A companion device hub to control initialization of tasks of an operatively coupled information handling system comprising:
a hub processor;
a hub memory device;
a hub power management unit (PMU);
a microphone to receive voice commands from a user;
the hub processor executing machine readable code instructions of task history generation system to capture contextual history data of a first plurality of tasks previously executed on the information handling system;
the microphone receiving a first voice command from a user of the companion device hub received to initiate a task to be executed on the operatively coupled information handling system;
a hub radio system transmitting a load prioritization order of a different second plurality of tasks to the operatively coupled information handling system for initialization; and
the hub processor executing machine readable code instructions of a firmware load time monitor to, when the different second plurality of tasks does not completely initiate:
initiate, during initialization of the information handling system, an initialization management mode that initiates, based on the first voice command and the contextual history data, a highest priority task of the different second plurality of tasks according to the load prioritization order that has a shortest anticipated load time for initialization among the different second plurality of tasks.

9. The companion device hub of claim 8 further comprising:
the hub processor executing machine readable code instructions of the firmware load time monitor to, when the different second plurality of tasks does not completely initiate, initiate, during the initialization of the information handling system, the initialization management mode that initiates, based on the first voice command and the contextual history data, the highest priority task of the different second plurality of tasks according to the load prioritization order and that has the shortest anticipated load time for initialization among the different second plurality of tasks and consumes the lowest amount of power during the initialization.

10. The companion device hub of claim 8, wherein the companion device hub is operatively coupled to the information handling system via a hub radio and antenna on the companion device hub.

11. The companion device hub of claim 8 further comprising:
a speaker to provide audio output to a user of the companion device hub.

12. The companion device hub of claim 8 further comprising:
a wired connector to operatively couple the companion device hub to the information handling system.

13. The companion device hub of claim 8 further comprising:
a companion device hub radio to operatively couple the companion device hub to the information handling system.

14. A method of operating a companion device hub to control initialization of tasks at an operatively coupled information handling system comprising:

executing machine readable code instructions of a task history generation system with the hub processor to capture contextual history data of a first plurality of tasks previously executed on the operatively coupled information handling system;

transmitting a load prioritization order of a different second plurality of tasks to the operatively coupled information handling system for initialization; and the hub processor executing machine readable code instructions of a firmware load time monitor to, when the different second plurality of tasks does not completely initiate:

initiate, during initialization of the information handling system, an initialization management mode that initiates, based on the contextual history data, a highest priority task of the different second plurality of tasks according to the load prioritization order that has a shortest anticipated load time for initialization among the different second plurality of tasks, wherein the different second plurality of tasks does not completely initiate when at least one of firmware fails to update and the firmware is corrupted.

15. The method of claim 14 further comprising:

the hub processor executing machine readable code instructions of the firmware load time monitor to, when the different second plurality of tasks does not completely initiate, initiate, during the initialization of the information handling system, the initialization management mode that initiates, based on the contextual history data, the highest priority task of the different second plurality of tasks according to the load prioritization order that has the shortest anticipated load time for initialization among the different second plurality of tasks and consumes the lowest amount of power during the initialization.

16. The method of claim 14 further comprising:

with a speaker, providing audio output to a user of the companion device hub.

17. The method of claim 14 further comprising:

with a microphone, receiving a voice command from a user of the companion device hub that is received by the hub processor executing machine readable code instructions of the policy based contextual system, wherein the load prioritization order is further based on the received voice command and the captured contextual history data during the initialization of the operatively coupled information handing system, the microphone being an active microphone to detect voice commands.

18. The method of claim 14 further comprising:

receiving a command from an input external to the companion device hub that is received by the hub processor executing machine readable code instructions of the policy based contextual system, wherein the load prioritization order is further based on the external input and the captured contextual history data.

19. The method of claim 14 further comprising:

operatively coupling the hub processor to the operatively coupled information handling system for added hardware processing when a wired connector is detected at an input connection on the companion device hub.

20. The method of claim 14 further comprising:

operatively coupling the companion device hub to the information handling system via a hub radio and antenna on the companion device hub.

\* \* \* \* \*